No. 890,578. PATENTED JUNE 9, 1908.
S. J. SILL.
MACHINE FOR REMOVING RUBBER HOSE FROM MANDRELS.
APPLICATION FILED JAN. 8, 1908.
2 SHEETS—SHEET 1.
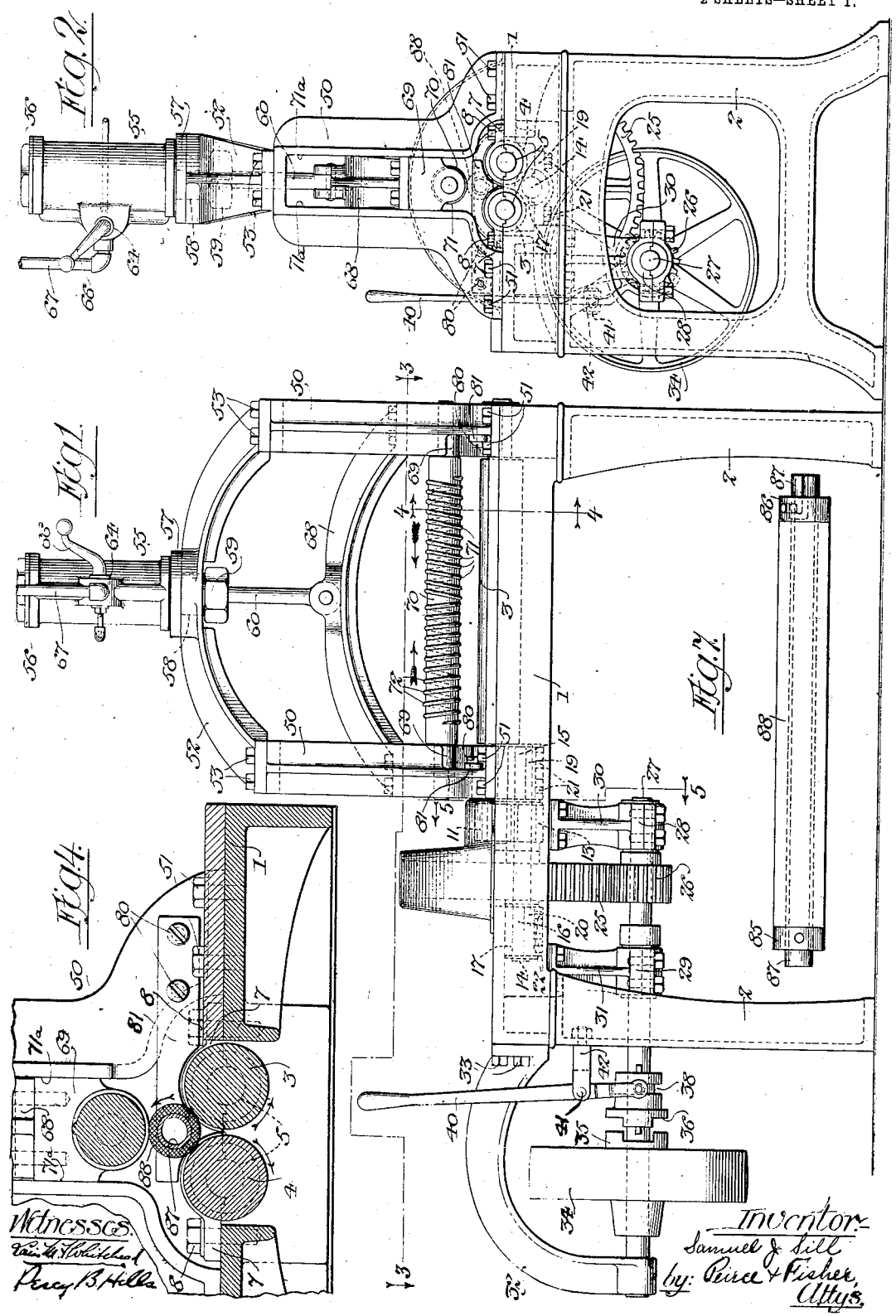

No. 890,578. PATENTED JUNE 9, 1908.
S. J. SILL.
MACHINE FOR REMOVING RUBBER HOSE FROM MANDRELS.
APPLICATION FILED JAN. 8, 1908.
2 SHEETS—SHEET 2.
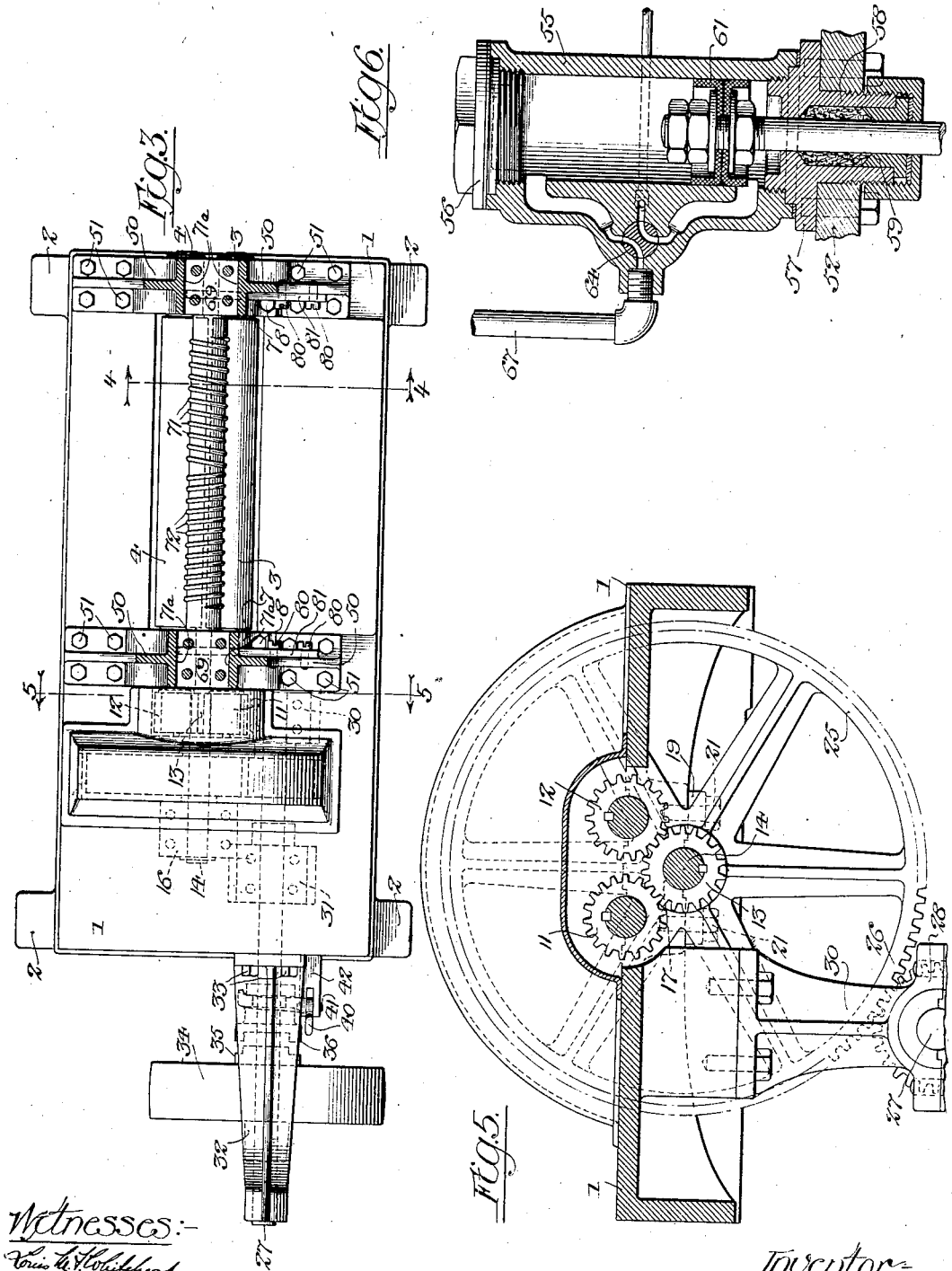
Witnesses:-
Louis A. Whitehead
Percy B. Hills
Inventor:-
Samuel J. Sill
by:- Peirce & Fisher
Attys:-

UNITED STATES PATENT OFFICE.

SAMUEL J. SILL, OF BUFFALO, NEW YORK, ASSIGNOR OF ONE-HALF TO HERBERT H. HEWITT, OF BUFFALO, NEW YORK.

MACHINE FOR REMOVING RUBBER HOSE FROM MANDRELS.

No. 890,578.  Specification of Letters Patent.  Patented June 9, 1908.

Application filed January 8, 1908. Serial No. 409,772.

*To all whom it may concern:*

Be it known that I, SAMUEL J. SILL, a citizen of the United States, and a resident of the city of Buffalo, county of Erie, State of New York, have invented certain new and useful Improvements in Machines for Removing Rubber Hose from Mandrels, of which I do declare the following to be a full, clear, and exact description, reference being had to the accompanying drawings, forming part of this specification.

In subjecting a section of rubber hose to the vulcanizing operation, it is mounted upon a mandrel. When the mandrel, with the hose thereon, is withdrawn from the vulcanizer, it is found that the rubber lining of the hose adheres more or less tenaciously to the mandrel, so that the removal of the hose, without impairing the rubber lining, is apt to be attended with considerable difficulty.

The object of the present invention is to provide improved means for loosening the rubber hose from the mandrel so that the hose can be readily removed therefrom.

To this end, the invention consists in the novel mechanism hereinafter described, illustrated in the accompanying drawings and particularly pointed out in the claims at the end of this specification.

Figure 1 is a front view of a machine embodying my invention. Fig. 2 is an end view thereof. Fig. 3 is a plan view with the parts shown in section on the line 3—3 of Fig. 1. Figs. 4 and 5 are cross sections on lines 4—4 and 5—5 respectively of Figs. 1 and 3. Fig. 6 is a detail section of the operating cylinder. Fig. 7 is a view of a vulcanizing mandrel with a hose section mounted thereon.

The bed-plate 1 of the machine is supported upon suitable legs 2 at the ends thereof. In an opening in the bed-plate 1 are mounted a pair of bottom or driving rolls 3 and 4, these rolls being journaled in suitable bearings. As shown, the bed-plate is formed with recesses 5 to receive the journals at the outer ends of the rolls 3 and 4 and the journals at the opposite ends of these rolls are mounted in similar recesses of the bed-plate. Over the journals at the outer ends of the bottom rolls 3 and 4 sit the bearing caps 7 that are bolted as at 8 to the bed-plate, and the journals at the opposite ends of the rolls are retained in place by similar bearing caps that are bolted to the bed-plate. Upon the inner ends of the rolls 3 and 4 are keyed the gear wheels 11 and 12 that mesh with a gear wheel 13 (see Fig. 5) that is mounted upon an intermediate shaft 14. This shaft 14 is journaled in bearings 15 and 16 beneath the bed-plate 1 of the machine, these bearings being preferably formed in part by the cavities 17 on the underside of the bed-plate and in part by the bearing caps 19 and 20 that are bolted as at 21 and 22, respectively, to the underside of the bed-plate. Upon the intermediate shaft 14 is keyed a gear wheel 25 that meshes with a pinion 26 keyed on the main drive shaft 27. This main drive shaft is mounted in suitable bearings 28 and 29 at the lower ends of brackets 30 and 31 that are bolted to the underside of the bed-plate 1. The outer end of the drive shaft 27 is journaled in a goose-necked bracket 32 that is bolted as at 33 to the end of the bed-plate 1, and upon this drive shaft 27 is loosely mounted the drive pulley 34 having fixed thereto a clutch member 35 adapted to mesh with a corresponding clutch member 36 that is splined upon the drive shaft 27 so as to be moved into and out of engagement with the member 35. The clutch member 36 is formed with an annular groove 38 to receive studs projecting from the yoke-shaped lower end of the clutch lever 40 that is pivotally mounted as at 41 upon a bracket 42 projecting from the end of the machine, the upper end of this lever forming a handle that extends within easy reach of the operator. It will readily be understood that by means of the clutch lever the drive shaft 27 can be quickly thrown into and out of engagement with the drive pulley 34 that will have rotation imparted thereto from a suitable source of power.

From the top of the bed-plate 1 rise the yoke-shaped standards or brackets 50, the flanged lower ends of which are bolted to the top of the bed-plate as at 51, and across the tops of these standards extends the yoke 52, the ends of which are bolted to the standards as at 53. Upon the top of the yoke 52 is mounted an air cylinder 55, the upper end of which is closed by a head or cap 56 and the lower end of which is closed by a cap or base 57 that has an extension 58 passing through the yoke 52, the threaded lower end of which is provided with a suitable stuffing-box 59 through which, and through the base, passes the piston rod 60 that is connected to the piston 61 within the air cylinder 55. The cylinder 55 has at one side thereof a valve chamber 64 containing a valve of any suitable construction for controlling the passage of air to the opposite ends of the cylinder and from this valve extends a stem that is fitted with a hand-lever 66. A pipe 67 for compressed air or other motive fluid leads to the valve chamber 64.

To the lower end of the piston rod 60 is pivotally connected a yoke 68, to the outer ends of which yoke are secured the bearing-blocks 69 in which are journaled the ends of the top roll 70. The bearing-blocks 69 are mounted to slide within the guideways 71ᵃ of the standards or brackets 50. By pivotally mounting the yoke 68 to the lower end of the piston rod 60, a rocking motion is allowed to this yoke and to the roll 70 in order to more uniformly distribute the pressure of the roll throughout its length. Each half of the upper or top roll 70 is provided with reversely arranged spiral ribs or threads 71 and 72, the faces of these ribs or threads being rounded to avoid the cutting of the surface of the hose upon which the top roll will bear. The purpose of the reversely arranged threads or ribs is to crowd or squeeze the hose lengthwise upon the vulcanizing mandrel whereon it will be mounted, and thus effect the loosening of the rubber hose from the mandrel, and I prefer the reverse arrangement of the ribs or threads 71 and 72, as, in practice, this has been found to most effectively loosen the hose from the mandrel.

At the base of the standards or brackets 50 are bolted as at 80 the guides or plates 81 against which will bear the ends of the mandrel whereon the hose is mounted to hold the same against the endwise movement.

In Fig. 7 of the drawings there is shown a vulcanizing mandrel 87 between the fixed collar 85 and the removable collar 86 on which is mounted a section of hose 88 and when it is desired to loosen the hose section from the surface of the mandrel, the mandrel, with the hose thereon, will be placed upon the bottom or driving rolls 3 and 4, the ends of the mandrel extending between the guides or plates 81. The operator, by shifting the hand-lever 66, will cause compressed air to pass to the top of the cylinder 55, thereby forcing the top roll 70 down on to the surface of the hose 88. The operator will then shift the clutch lever 40 so as to throw the drive shaft 27 into gear with the drive pulley 34, and, by so doing, will cause rotation to be imparted to the bottom or drive rolls 3 and 4. The friction between the drive rolls 3 and 4 and the hose will cause the latter to revolve and the pressure of the spiral ribs or threads 71 and 72 of the top roll 70 will crowd the rubber lengthwise and, preferably, from the ends towards the center of the mandrel, thereby loosening the hose from the mandrel. When the hose has thus been loosened from the mandrel, the operator—by reversing the hand lever 66—will cause compressed air to pass to the lower end of the cylinder 55, thereby causing the piston of this cylinder to raise the top roll 70, after which the mandrel, with the hose thereon, will be removed from the machine and the cap 86 will be detached from the end of the mandrel so as to permit the hose to be withdrawn therefrom.

It is manifest that the precise details of the construction above set out may be varied without departure from the scope of the invention.

Certain features of the invention above described correspond to features of construction described and claimed in an application for improvements in hose making machines filed by me of even date herewith, and I do not wish to be understood as claiming herein such features of construction as are claimed in the companion application.

Having thus described my invention, what I claim as new, and desire to secure by Letters Patent, is:—

1. A machine of the character described, comprising a plurality of rolls between which a mandrel with a hose thereon may be mounted and means for imparting revolution to said rolls, one of said rolls being provided with ribs or projecting portions adapted to crowd the hose lengthwise on its mandrel so as to loosen it therefrom.

2. A machine of the character described, comprising a plurality of rolls between which a mandrel with a hose thereon may be mounted and means for imparting revolution to said rolls, one of said rolls being provided with reversely arranged ribs or projections for crowding the hose lengthwise of its mandrel to loosen it therefrom.

3. A machine of the character described, comprising a plurality of rolls between which a mandrel with a hose thereon may be mounted, means for imparting revolution to said rolls, one of said rolls being provided with ribs or projecting portions adapted to crowd the hose lengthwise on its mandrel so as to loosen it therefrom, and a pivoted yoke for sustaining said last mentioned roll.

4. A machine of the character described, comprising a pair of bottom rolls, means for driving said rolls, a top or pressure roll having its surface provided with projections for crowding lengthwise the hose upon its mandrel and means for raising and lowering said top or pressure roll.

SAMUEL J. SILL.

Witnesses:
HARRY L. CLAPP,
KATHARINE GERLACH.